(12) United States Patent
Kovac et al.

(10) Patent No.: US 7,498,931 B2
(45) Date of Patent: Mar. 3, 2009

(54) TIRE PRESSURE MONITORING SYSTEM

(75) Inventors: Zoran Kovac, Macomb Township, MI (US); Riad Ghabra, Dearborn Heights, MI (US); Bruce Conner, Ann Arbor, MI (US); John Nantz, Brighton, MI (US)

(73) Assignee: Lear Corporation, Southfield, MI (US)

( * ) Notice: Subject to any disclaimer, the term of this patent is extended or adjusted under 35 U.S.C. 154(b) by 241 days.

(21) Appl. No.: 11/467,688

(22) Filed: Aug. 28, 2006

(65) Prior Publication Data

US 2008/0055061 A1 Mar. 6, 2008

(51) Int. Cl.
*B60C 23/02* (2006.01)

(52) U.S. Cl. .................... 340/442; 340/444; 340/445; 340/447; 340/449; 73/146; 73/146.5

(58) Field of Classification Search ............. 340/442, 340/443, 444, 445, 447, 449; 73/146, 146.5; 116/34 R; 200/61.22; 701/1, 5, 29, 31
See application file for complete search history.

(56) References Cited

U.S. PATENT DOCUMENTS

| | | | |
|---|---|---|---|
| 6,489,888 B1 * | 12/2002 | Honeck et al. ............. 340/442 |
| 6,771,169 B1 | 8/2004 | Kaminski et al. |
| 6,880,394 B2 | 4/2005 | Boulot |
| 6,897,770 B2 | 5/2005 | Lill |
| 7,265,660 B2 * | 9/2007 | Watanabe .................. 340/447 |
| 2003/0071723 A1 | 4/2003 | Tang et al. |
| 2003/0164758 A1 * | 9/2003 | King et al. ................. 340/442 |
| 2005/0132791 A1 | 6/2005 | Hayashi |
| 2005/0156724 A1 | 7/2005 | Shibata |
| 2005/0187667 A1 * | 8/2005 | Vredevoogd et al. .......... 701/1 |
| 2006/0082451 A1 | 4/2006 | Shaw |

FOREIGN PATENT DOCUMENTS

| | | |
|---|---|---|
| JP | 2004330971 A | 11/2004 |
| WO | 02/090136 A1 | 11/2002 |
| WO | 2004/037566 A1 | 5/2004 |
| WO | 2005018963 A1 | 3/2005 |

* cited by examiner

*Primary Examiner*—Hung T. Nguyen
(74) *Attorney, Agent, or Firm*—Brooks Kushman P.C.

(57) ABSTRACT

A tire pressure monitoring system may adjust the power it consumes. In at least one embodiment, the system includes a receiver that receives a first signal having a signal strength, determines the signal strength, and causes a second signal to be sent if the signal strength is more than a desired signal strength.

15 Claims, 3 Drawing Sheets

TIRE PRESSURE MONITORING SYSTEM

BACKGROUND OF THE INVENTION

The invention relates to tire pressure monitoring systems.

SUMMARY

In at least one embodiment, the invention takes the form of a tire pressure monitoring system for a vehicle. The system includes a sensor module that consumes power and transmits a first signal having a first signal strength. The system further includes a receiver that receives the first signal and determines the first signal strength. The receiver also causes a transmitter to send a second signal for the module if the first signal strength is more than a desired signal strength. The module reduces the power it consumes in response to the second signal.

In at least one embodiment, the invention takes the form of a tire pressure monitoring system for a vehicle. The system includes a sensor module that consumes power and transmits a first signal having a signal strength. The system also includes a transceiver that receives the first signal, determines whether the signal strength is more than a desired signal strength, and transmits a second signal for the module if the signal strength is more than the desired signal strength. The module reduces the power it consumes in response to the second signal.

In at least one embodiment, the invention takes the form of a tire pressure monitoring system for a vehicle. The system includes a receiver that receives a first signal having a signal strength, determines the signal strength, and causes a second signal to be sent if the signal strength is more than a desired signal strength.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1b shows a portion of the system of FIG. 1a;

FIG. 1c shows a portion of the system of FIG. 1a; and

DETAILED DESCRIPTION

Figure 1A:
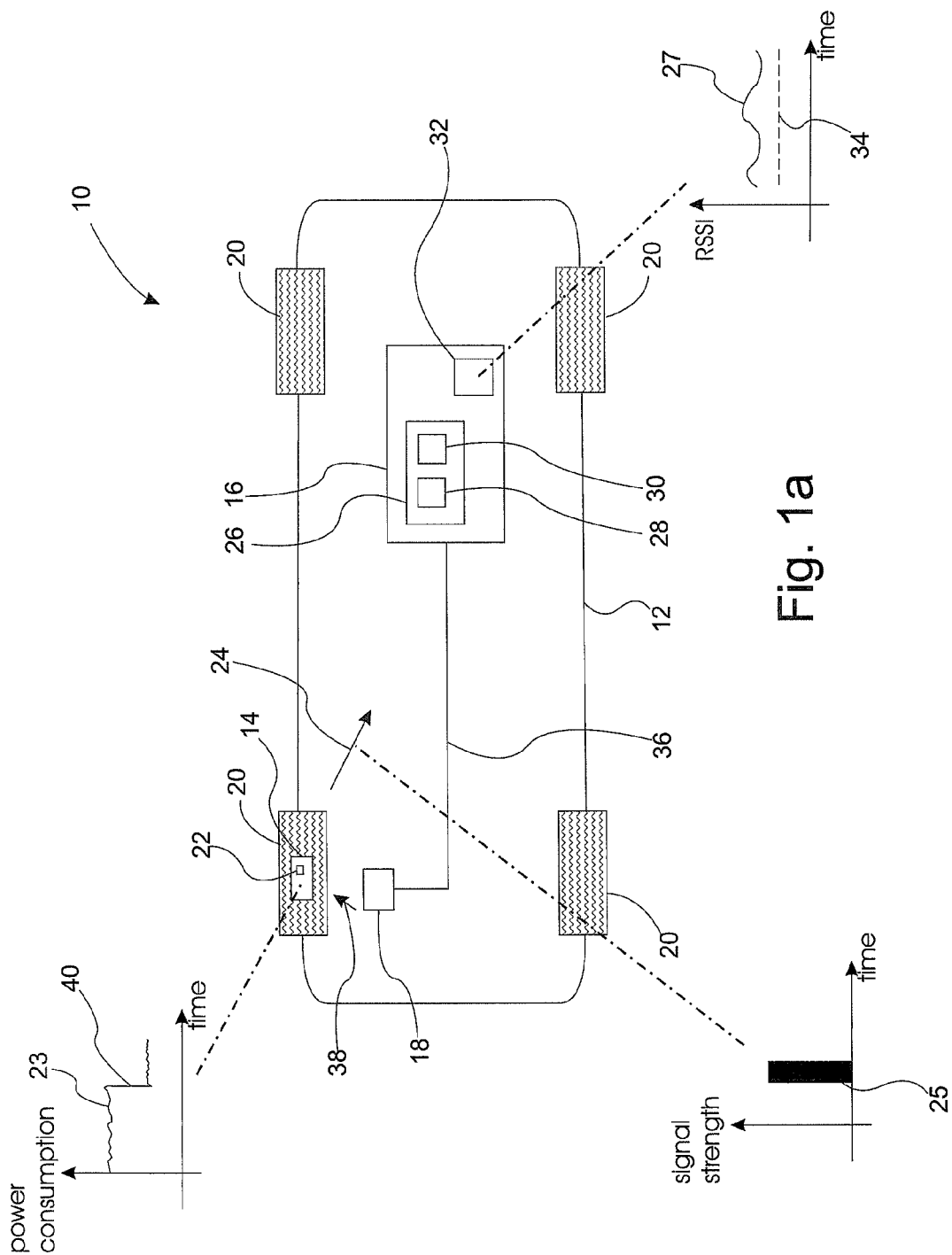
FIG. 1a shows a system in accordance with an embodiment of the invention.

FIG. 1a shows tire pressure monitoring system 10 for vehicle 12. System 10 includes sensor module 14, receiver 16, and transmitter 18.

Sensor module 14 is associated with wheel tire-assembly 20 and senses tire pressure within wheel-tire assembly 20. Sensor module 14 consumes power from power storage cell 22, e.g., battery. The power consumption may start at predetermined or default level 23, e.g., 30 milliwatts (mW). At least a portion of the power consumed by sensor module 14 is used to transmit information signal 24 having signal strength 25. Sensor module 14 transmits information signal 24 periodically or in response to request signal 38 from transmitter 18 as will be explained in detail below. Information signal 24 is a continuous or modulated radio signal. Information signal 24, however, may be any type of desired signal, e.g., ultrasound or infrared. Information signal 24 may include tire pressure information.

Receiver 16 is a radio frequency receiver. Receiver 16, however, may be any type of suitable receiver. Receiver 16 includes circuitry 26 that receives information signal 24 and determines signal strength 25 based on received signal strength indicator (RSSI) 27. RSSI 27 is an output voltage. RSSI 27, however, may take any desired form.

Circuitry 26 includes mixer 28 and limiter amplifier 30. Limiter amplifier 30 follows mixer 28. RSSI 27 is measured after limiter amplifier 30. RSSI 27, however, may be measured at any suitable location.

Receiver 16 includes micro controller 32 that determines whether RSSI 27 is more or less than predetermined desired signal strength 34. Desired signal strength 34 may be determined by measuring an RSSI (voltage) of environmental noise, e.g., 0.3 v, and adding a voltage offset, e.g., 0.3 v, thereby producing a desired signal-to-noise ratio. FIG. 1a illustrates the case where RSSI 27 is more than desired signal strength 34. RSSI 27, however, may be less than or approximately equal to desired signal strength 34.

Transmitter 18 is a low frequency initiator. Transmitter 18, however, may be any suitable magnetic field generator. Transmitter 18 communicates with receiver 16 via physical data link 36, e.g., Car Area Network (CAN). Transmitter 18 and receiver 16, however, may be configured to communicate via wireless.

If micro controller 32 determines RSSI 27 to be more than desired signal strength 34, receiver 16 instructs transmitter 18 to generate reduce power command signal 38. Sensor module 14, in response to receiving reduce power command signal 38, reduces the power it consumes by predetermined amount 40, e.g., 1 mW step size, thereby reducing signal strength 25 of information signal 24.

Figure 1C:
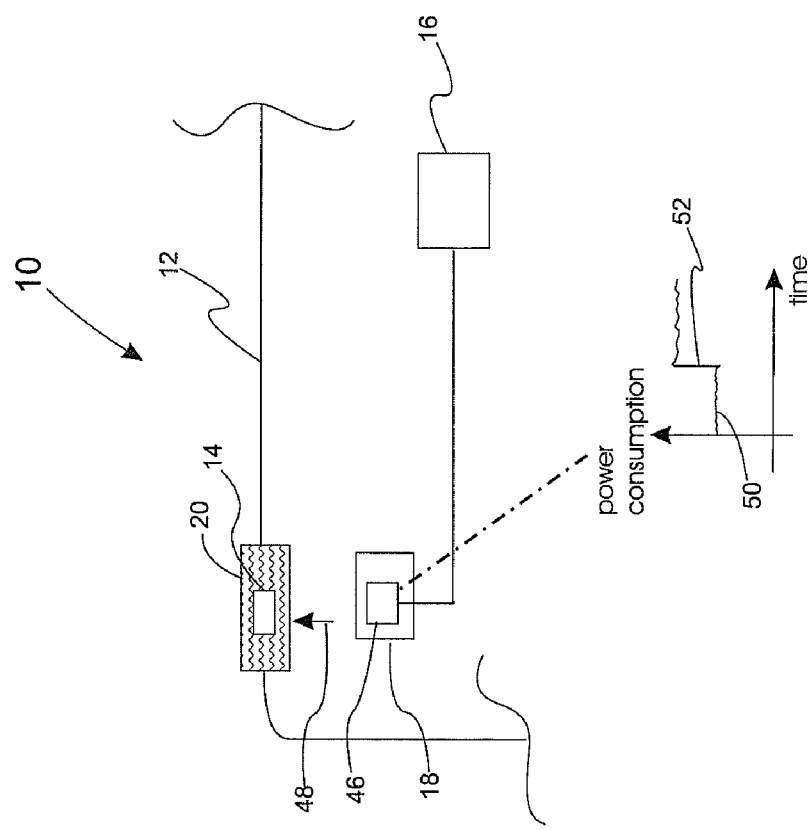
Figure 1B:
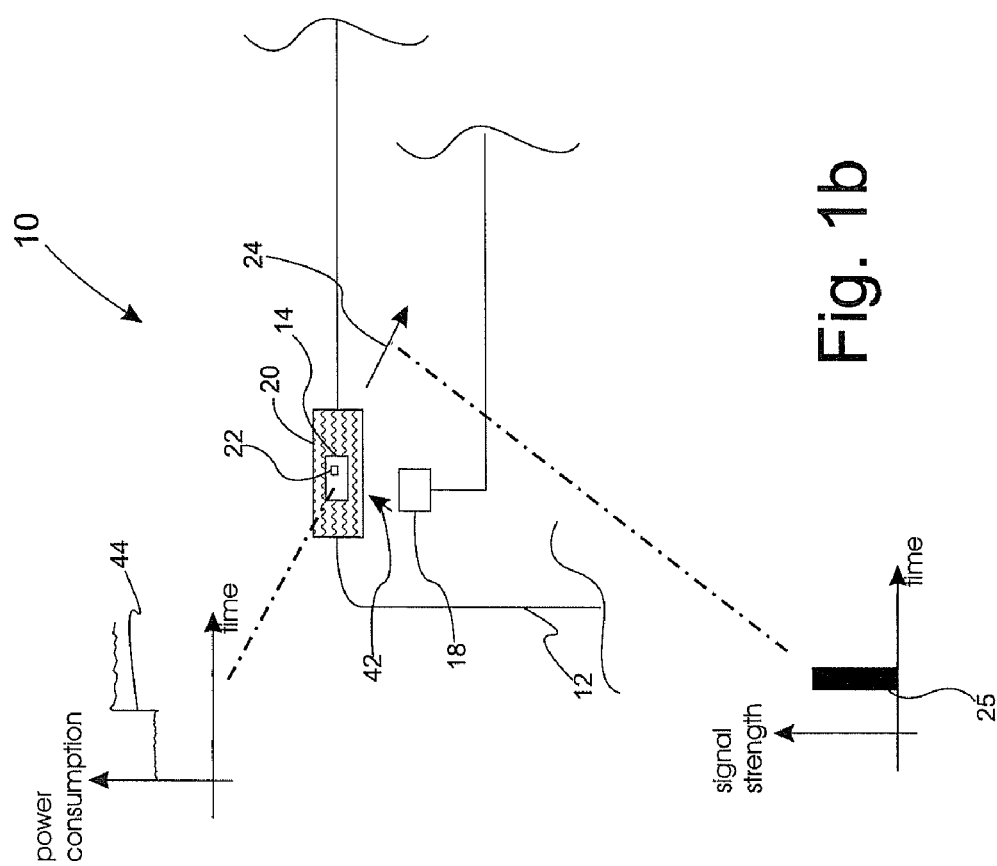

FIG. 1b shows a portion of FIG. 1a. If micro controller 32 determines RSSI 27 to be less than desired signal strength 34, receiver 16 instructs transmitter 18 to generate increase power command signal 42. Sensor module 14, in response to receiving increase power command signal 42, increases the power it consumes by predetermined amount 44, e.g., 2 mW step size, thereby increasing signal strength 25 of information signal 24.

FIG. 1c shows a portion of FIG. 1a. Transmitter 18 consumes power from power storage cell 46, e.g., battery. At least a portion of the power consumed by transmitter 18 is used to transmit request signal 48. Receiver 16 may instruct transmitter 18 to generate request signal 48. As explained above, sensor module 14, in response to receiving request signal 48, transmits information signal 24. If sensor module 14 cannot sense request signal 48, sensor module 14 will not generate information signal 24. If receiver 16 instructs transmitter 18 to generate request signal 48 and receiver 16, within a predetermined period of time, e.g., 200 milliseconds (mS), does not sense information signal 24, receiver 16 can instruct transmitter 18 to increase its power consumption by predetermined amount 52, e.g., 2 mW step size. This cycle may repeated until receiver 16 senses information signal 24.

System 10 may seek to adjust its power consumption on a periodic basis, e.g., every 10 minutes. System 10 may also adjust its power consumption at vehicle start-up.

Although system 10 of FIGS. 1a, 1b, and 1c illustrate one sensor module 14 associated with one wheel-tire assembly 20, each of wheel-tire assemblies 20 may have sensor module 14 and transmitter 18 associated with them. When there are four such sensor modules 14, identification information may be included in respective information signals 24 such that receiver 16 is able to distinguish between respective information signals 24 based on the identification information. Alternatively, receiver 16 may sequentially cause respective transmitters 18 to generate request signal 48 such that receiver 16 can determine which of information signals 24 is associated with respective transmitters 18 based on the sequence of received information signals 24.

Figure 2:
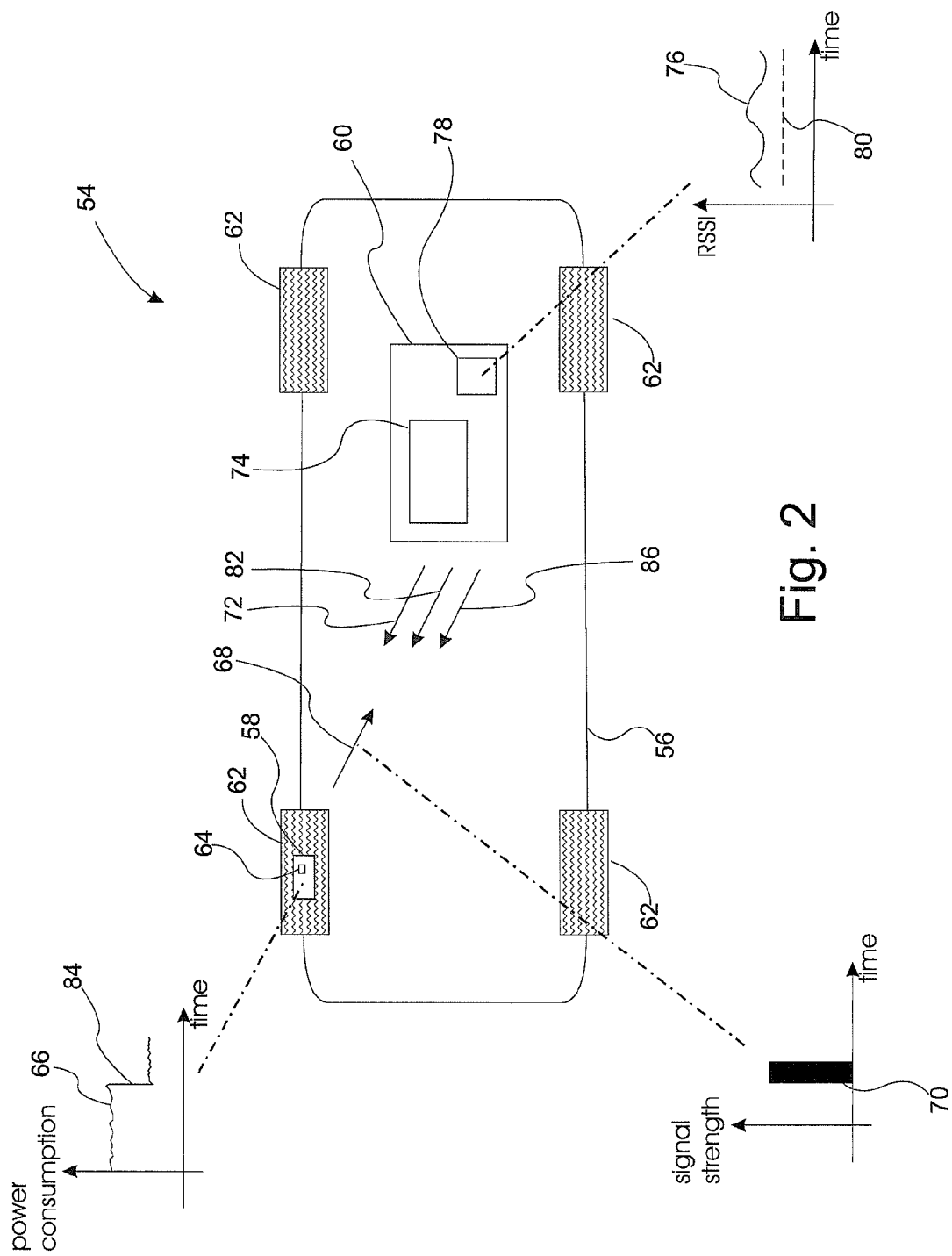
FIG. 2 shows a system in accordance with an embodiment the invention.

FIG. 2 shows tire pressure monitoring system 54 for vehicle 56. System 54 includes sensor module 58 and transceiver 60.

Sensor module 58 is associated with wheel tire-assembly 62 and senses tire pressure within wheel-tire assembly 62. Sensor module 58 consumes power from power storage cell 64, e.g., battery. The power consumption may start at predetermined or default level 66. At least a portion of the power consumed by sensor module 58 is used to transmit information signal 68 having signal strength 70. Sensor module 58 transmits information signal 68 periodically or in response to request signal 72 from transceiver 60 as will be explained in detail below. Information signal 68 is a continuous or modulated radio signal. Information signal 68, however, may be any type of desired signal. Information signal 68 may include tire pressure information.

Transceiver 60 is a radio frequency transceiver. Transceiver 60, however, may be any type of suitable transceiver. Transceiver 60 includes circuitry 74 that receives information signal 68 and determines signal strength 70 based on received signal strength indicator (RSSI) 76. RSSI 76 is an output voltage. RSSI 76, however, can take any desired form.

Transceiver 60 includes micro controller 78 that determines whether RSSI 76 is more or less than predetermined desired signal strength 80. If micro controller 78 determines RSSI 76 to be more than desired signal strength 80, transceiver 60 generates reduce power command signal 82 for sensor module 58. Sensor module 58, in response to receiving reduce power command signal 82, reduces the power it consumes by predetermined amount 84, e.g., 1 mW step size, thereby reducing signal strength 70 of information signal 68. If micro controller 78 determines RSSI 76 to be less than desired signal strength 80, transceiver 60 generates increase power command signal 86 for sensor module 58. Sensor module 58, in response to receiving increase power command signal 86, increases the power it consumes thereby increasing signal strength 70 of information signal 68.

System 54 may seek to adjust its power consumption on a periodic basis, e.g., every 10 minutes. System 54 may also adjust its power consumption at vehicle start-up.

Although system 54 of FIG. 2 illustrates one sensor module 58 associated with one wheel-tire assembly 62, each of wheel-tire assemblies 62 may have sensor module 58 associated with them. When there are four such sensor modules 58 used, identification information may be included in respective information signals 68 such that transceiver 60 is able to distinguish between respective information signals 68.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tire pressure monitoring system for a vehicle comprising:
a sensor module configured to consume power and transmit a first signal having a first signal strength;
a receiver configured to receive the first signal and to determine the first signal strength; and
a transmitter in communication with the receiver;
wherein the receiver is configured to cause the transmitter to send a second signal for the sensor module if the first signal strength is more than a desired signal strength and wherein the sensor module reduces the power it consumes in response to the second signal;
wherein the receiver is further configured to cause the transmitter to send a third signal to the sensor module, and wherein the sensor module transmits the first signal in response to receiving the third signal, and wherein the receiver is further configured to cause the transmitter to increase its power consumption if the receiver does not receive the first signal within a predetermined period of time after the receiver causes the transmitter to send the third signal to the sensor module.

2. The system of claim 1 wherein the receiver is further configured to determine if the first signal strength is less than the desired signal strength.

3. The system of claim 2 wherein the receiver is further configured to cause the transmitter to send a fourth signal to the sensor module if the first signal strength is less than the desired signal strength and wherein the sensor module increases the power it consumes in response to the fourth signal.

4. The system of claim 1 wherein the receiver determines whether the first signal strength is more than the desired signal strength based on a received signal strength indicator.

5. The system of claim 1 wherein the first signal comprises a radio signal.

6. The system of claim 1 wherein the desired signal strength is predetermined.

7. The system of claim 1 wherein the transmitter comprises a low frequency initiator.

8. The system of claim 1 wherein the sensor module reduces the power it consumes by a predetermined amount.

9. A tire pressure monitoring system for a vehicle comprising:
a sensor module configured to consume power and transmit a first signal having a signal strength; and
a transceiver configured to receive the first signal, to determine whether the signal strength is more than a desired signal strength, and to transmit a second signal for the sensor module if the signal strength is more than the desired signal strength;
wherein the sensor module reduces the power it consumes in response to the second signal;
wherein the transreceiver is further configured to send a third signal to the sensor module, and wherein the sensor module transmits the first signal in response to receiving the third signal, and wherein the transceiver is further configured to increase its power consumption if the transceiver does not receive the first signal within a predetermined period of time after the transceiver sends the third signal to the sensor module.

10. The system of claim 9 wherein the transceiver is further configured to determine whether the signal strength is less than the desired signal strength.

11. The system of claim 10 wherein the transceiver transmits a fourth signal for the sensor module if the signal strength is less than the desired signal strength and wherein the sensor module increases the power it consumes in response to the fourth signal.

12. The system of claim 9 wherein the transceiver determines whether the signal strength is more than the desired signal strength based on a received signal strength indicator.

13. The system of claim 9 wherein the first signal comprises a radio frequency signal.

14. The system of claim 9 wherein the desired signal strength is predetermined.

15. The system of claim 9 wherein the sensor module reduces the power it consumes by a predetermined amount.

* * * * *